US011556852B2

(12) United States Patent
Staar et al.

(10) Patent No.: US 11,556,852 B2
(45) Date of Patent: Jan. 17, 2023

(54) EFFICIENT GROUND TRUTH ANNOTATION

(71) Applicant: INTERNATIONAL BUSINESS MACHINES CORPORATION, Armonk, NY (US)

(72) Inventors: Peter Willem Jan Staar, Wädenswil (CH); Michele Dolfi, Zurich (CH); Christoph Auer, Zurich (CH); Leonidas Georgopoulos, Zurich (CH); Ralf Kaestner, Othmarsingen (CH); Alexander Velizhev, Oberrieden (CH); Dal Noguer Hidalgo, Zurich (CH); Rita Kuznetsova, Zurich (CH); Konstantinos Bekas, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 16/811,421

(22) Filed: Mar. 6, 2020

(65) Prior Publication Data

US 2021/0279636 A1    Sep. 9, 2021

(51) Int. Cl.
*G06N 20/00*    (2019.01)
*G06F 16/28*    (2019.01)

(52) U.S. Cl.
CPC ........... *G06N 20/00* (2019.01); *G06F 16/285* (2019.01)

(58) Field of Classification Search
CPC ............................. G06N 20/00; G06F 16/285
See application file for complete search history.

(56) References Cited

U.S. PATENT DOCUMENTS

| 5,021,989 | A | 6/1991 | Fujisawa |
| 5,781,785 | A | 7/1998 | Rowe |
| 5,818,966 | A | 10/1998 | Prasad |

(Continued)

FOREIGN PATENT DOCUMENTS

| CN | 101689203 B | 9/2013 |
| CN | 108898137 A | 11/2018 |

(Continued)

OTHER PUBLICATIONS

Kodirov, 2017, arXiv sections 1-6.*

(Continued)

*Primary Examiner* — Michael I Ezewoko
(74) *Attorney, Agent, or Firm* — Daniel G. DeLuca (57) ABSTRACT

A computer-implemented method for determining a set of target items to be annotated for training a machine learning application. The method comprises providing a training data set with a set of data samples and an auto-encoder with a classifier. The auto-encoder comprises an embedding model that maps the set of data samples to a set of compressed feature vectors. The set of compressed feature vectors define a compressed feature matrix. Further provided are: a definition of a graph associated to the compressed feature matrix, applying a clustering-algorithm to identify node clusters of the graph and applying a centrality algorithm to identify central nodes of the node clusters, retrieving from an annotator node labels for the central nodes, propagating the annotated node labels to other nodes of the graph and performing a training of the embedding model and the classifier with the annotated and the propagated node labels.

22 Claims, 8 Drawing Sheets

(56) References Cited

U.S. PATENT DOCUMENTS

| | | | |
|---|---|---|---|
| 6,401,097 B1 | 6/2002 | Mccotter | |
| 6,981,209 B1 | 12/2005 | Parikh | |
| 7,543,229 B2 | 6/2009 | Peiro | |
| 9,032,006 B2* | 5/2015 | Bekas | G06F 17/12 708/520 |
| 9,262,380 B2* | 2/2016 | Bekas | G06F 7/556 |
| 10,089,742 B1 | 10/2018 | Lin et al. | |
| 10,210,178 B2 | 2/2019 | Souche et al. | |
| 10,331,976 B2* | 6/2019 | Akata | G06K 9/6232 |
| 2004/0006742 A1 | 1/2004 | Slocombe | |
| 2004/0034455 A1 | 2/2004 | Simonds | |
| 2005/0053283 A1 | 3/2005 | Wakeam | |
| 2006/0200752 A1 | 9/2006 | Sellers | |
| 2006/0236237 A1 | 10/2006 | Peiro | |
| 2007/0168382 A1 | 7/2007 | Tillberg | |
| 2008/0168342 A1 | 7/2008 | Shur | |
| 2008/0317343 A1 | 12/2008 | Ferman | |
| 2009/0019011 A1 | 1/2009 | Lee | |
| 2009/0110268 A1 | 4/2009 | Dejean | |
| 2010/0131614 A1 | 5/2010 | Bremer, Jr. | |
| 2011/0255791 A1 | 10/2011 | Abdo | |
| 2014/0006982 A1 | 1/2014 | Wabyick | |
| 2014/0013215 A1 | 1/2014 | Sesum | |
| 2014/0314319 A1 | 10/2014 | Hamel | |
| 2014/0376804 A1 | 12/2014 | Akata | |
| 2015/0199314 A1 | 7/2015 | Ratnakar | |
| 2015/0199821 A1 | 7/2015 | Lyubarskiy | |
| 2015/0262007 A1 | 9/2015 | Sesum | |
| 2017/0213139 A1 | 7/2017 | Sawant | |
| 2017/0351681 A1* | 12/2017 | Bekas | G06F 16/24578 |
| 2018/0075368 A1 | 3/2018 | Brennan | |
| 2018/0097812 A1 | 4/2018 | Gillett et al. | |
| 2018/0101726 A1 | 4/2018 | Wang et al. | |
| 2018/0300323 A1 | 10/2018 | Lee et al. | |
| 2018/0341688 A1 | 11/2018 | Ganesh | |
| 2018/0365248 A1 | 12/2018 | Zheng | |
| 2019/0102674 A1 | 4/2019 | Kwant et al. | |
| 2019/0302997 A1 | 10/2019 | Kouda | |
| 2019/0385059 A1 | 12/2019 | Huang | |
| 2020/0005154 A1 | 1/2020 | Herbster | |
| 2020/0045354 A1 | 2/2020 | Gao | |
| 2020/0294187 A1 | 9/2020 | Staar | |
| 2021/0279400 A1 | 9/2021 | Staar | |
| 2021/0279516 A1 | 9/2021 | Staar | |
| 2021/0279532 A1 | 9/2021 | Staar | |

FOREIGN PATENT DOCUMENTS

| | | |
|---|---|---|
| CN | 110110258 A | 8/2019 |
| CN | 110188189 A | 8/2019 |
| JP | 08227422 A | 9/1996 |
| JP | 2006031129 A | 2/2006 |
| WO | 2018213205 A1 | 11/2018 |
| WO | 2021176281 A1 | 9/2021 |
| WO | 2021176282 A1 | 9/2021 |

OTHER PUBLICATIONS

Xian, 2018, arXiv sections 1-6.*
IBM: List of IBM Patents or Patent Applications Treated as Related (Appendix P), Mar. 12, 2020, pp. 1-2.
Pending U.S. Appl. No. 16/811,457, filed Mar. 6, 2019, entitled: "Memory-Efficient Document Processing", 39 pages.
Pending U.S. Appl. No. 16/811,473, filed Mar. 6, 2019, entitled: "Ground Truth Generation for Image Segmentation", 35 pages.
Pending U.S. Appl. No. 16/811,490, filed Mar. 6, 2019, entitled: "Digital Image Processing", 38 pages.
Tao, Logical Labeling of Fixed Layout PDF Documents Using Multiple Contexts, 2014 11th IAPR International Workshop on Document Analysis Systems (Year: 2014).
Mell et al., "The NIST Definition of Cloud Computing", Recommendations of the National Institute of Standards and Technology, NIST Special Publication 800-145, Sep. 2011, 7 pages.
Ahmed et al., "A Generic Method for Automatic Ground Truth Generation of Camera-Captured Documents", arXiv:1605.01189v1, May 4, 2016, pp. 1-15.
Moll et al., "Truthing for Pixel-Accurate Segmentation", The Eighth IAPR International Workshop on Document Analysis Systems, Sep. 16-19, 2008, pp. 379-385.
Schulman, "Recognizing and Generating Natural Language Referring Expressions in Images", Thesis Submitted in Partial Fulfillment of the Requirements for the Master of Sciences Degree Under the Supervision of: Prof. Michael Elhadad, Ben—Gurion University of the Negev, Aug. 21, 2018, 72 pages.
Kahou et al., "FigureQA: An Annotated Figure Dataset for Visual Reasoning", Workshop Track—ICLR 2018, arXiv:1710.07300v2, Feb. 22, 2018, pp. 1-20.
Konyushkova et al., "Discovering General-Purpose Active Learning Strategies", arXiv:1810.04114v2, Apr. 2, 2019, pp. 1-10.
International Searching Authority, "Notification of Transmittal of the international Search Report and the Written Opinion of the International Searching Authority, or Declaration," Patent Cooperation Treaty, Apr. 29, 2021, 7 pages, International Application No. PCT/IB2021/050612.
International Searching Authority, "Notification of Transmittal of the international Search Report and the Written Opinion of the International Searching Authority, or Declaration," Patent Cooperation Treaty, May 7, 2021, 7 pages, International Application No. PCT/IB2021/050648.

* cited by examiner

FIG. 2b   Training

FIG. 2c   Inference   230

EFFICIENT GROUND TRUTH ANNOTATION

BACKGROUND

The present invention relates to a computer-implemented method for determining a set of target items to be annotated for training a machine learning application.

The present invention further relates to a corresponding system and a corresponding computer program product.

Current supervised machine learning algorithms may be very data-hungry, i.e. they may require a lot of annotated data in order to be trained successfully. This may be problematic for the application of such algorithms in an industrial setting as most industries do not maintain large annotated datasets and the cost of annotating large data sets is often substantial due to the need for qualified subject matter experts. Such annotated training data may also be referred to as ground truth.

Accordingly, there is a need for methods which facilitate to generate such ground truth in an efficient way, in particular to generate such ground truth from large datasets.

SUMMARY

According to an embodiment, the invention is embodied as a computer-implemented method for determining a set of target items to be annotated for training a machine learning application. The method comprises providing a training data set comprising a set of data samples. The set of data samples comprises a plurality of data items such as pixels. The method further comprises providing an auto-encoder. The auto-encoder encompasses a classifier. The method comprises performing an initial training of an embedding model of the auto-encoder, wherein the embedding model is configured to map the set of data samples to a set of compressed feature vectors. The feature vectors comprise feature elements. The set of compressed feature vectors define a compressed feature matrix of the set of data samples. The method comprises providing a definition of a graph associated to the compressed feature matrix, applying a clustering-algorithm to identify one or more node clusters of the graph and applying a centrality algorithm to identify one or more central nodes of the one or more node clusters. The method comprises retrieving from an annotator one or more node labels for the one or more central nodes of the one or more node clusters. This creates annotated node labels.

The method comprises propagating the annotated node labels of the one or more central nodes to other nodes of the graph, thereby creating propagated node labels and performing a further training of the auto-encoder. The further training of the autoencoder comprises training the embedding model of the auto-encoder and the classifier of the auto-encoder with the annotated and the propagated node labels. The classifier is configured to predict the one or more nodes labels for the elements of the compressed feature vectors.

Such an embodied method may allow to generate ground truth in an advanced way.

In particular, methods according to embodiments of the invention may determine one or more target items of a set of data samples that one should annotate to train a machine learning application in an efficient manner, in particular with an acceptable accuracy, recall and/or precision. The one or more target items establish according to embodiments a restricted set of items of the set of data samples. According to embodiments restricted shall mean that only a few or very few data-items need to be annotated compared to the entire set of data items. Accordingly, methods according to embodiments of the invention may facilitate to automatically determine the most relevant data items of a training data set that should be annotated.

According to an embodiment, the method further comprises repeating, at one or more iteration rounds, the applying of the clustering algorithm, the applying of the centrality algorithm, the propagating of the annotated labels and the performing of the further training of the auto-encoder until convergence.

The repeating of the above mentioned iterations until convergence may be used to verify that the central nodes of the clusters and its annotations have been chosen correctly. According to an embodiment, convergence shall mean that the trained embedding model does not change anymore according to one or more predefined criteria.

According to an embodiment, the method further comprises outputting the one or more node labels of the last iteration round before convergence as set of target items to be annotated. The outputted labels establish the set of target items in the training data set that should be annotated by a human annotator in order to generate an advantageous training data set. In this respect, an advantageous training data set shall be in particular understood as a training data set that provides good training results for the respective machine learning application.

According to an embodiment, the method further comprises repeating retrieving from one or more annotators node labels for the one or more central nodes of the one or more clusters. Such a repeating of the retrieving may be used on the one hand to get confirmation for an earlier annotation. Furthermore, it may be in particular useful to get additional feedback from the annotator in case the determined node clusters have changed to a predefined extent during an iteration round.

The definition of a graph associated to the compressed feature matrix facilitates the use of graph-based analytics to analyze the compressed feature matrix. According to an embodiment, the graph is defined by an adjacency matrix. The adjacency matrix is defined as the product of the compressed feature matrix and the transpose of the compressed feature matrix.

According to an embodiment, the applying the clustering algorithm comprises applying a graph-based clustering algorithm. Such graph-based clustering algorithms may be used to identify clusters of the graph in an efficient manner. There are a plurality of graph-based clustering algorithms known to a skilled person in the art which may be chosen according to embodiment in dependence on the respective training data set. Particularly suited graph-based clustering algorithms may include k-spanning tree or minimum spanning tree algorithms, shared nearest neighbor algorithms, algorithms based on betweenness centrality or spectral clustering algorithms.

According to an embodiment, the applying the centrality algorithm comprises applying a graph-based centrality algorithm. Such graph-based centrality algorithms may be used to identify central nodes of the clusters of the graph in an efficient manner. There are a plurality of graph-based centrality algorithms known to a skilled person in the art which may be chosen according to embodiments in dependence on the respective training data set and the clusters of the graph. One particularly suited graph-based centrality algorithm comprises approximating a product of a matrix exponential and a random probe vector of the adjacency matrix, computing a diagonal of the adjacency matrix based on the product of the matrix exponential and the random probe vector and calculating node centralities based on the computed diagonal until a predefined number of the one or more central nodes has been detected.

According to another embodiment a system for performing a computer-implemented method for performing a machine learning application is provided. The system comprises a processor and a computer readable memory. The system is configured to provide the training data set comprising a set of data samples, to provide an auto-encoder, the auto-encoder encompassing a classifier and to perform an initial training of an embedding model of the auto-encoder. The embedding model is configured to map the set of data samples to a set of compressed feature vectors comprising feature elements. The set of compressed feature vectors define a compressed feature matrix of the set of data samples. The system is further configured to provide a definition of a graph associated to the compressed feature matrix, to apply a clustering-algorithm to identify one or more node clusters of the graph, to apply a centrality algorithm to identify one or more central nodes of the one or more node clusters and to retrieve from an annotator one or more node labels for the one or more central nodes of the one or more node clusters. This creates annotated node labels. The system is further configured to propagate the annotated node labels of the one or more central nodes to other nodes of the graph, thereby creating propagated node labels. The system is further configured to perform a further training of the auto-encoder. The further training comprises training the embedding model of the auto-encoder and the classifier of the auto-encoder with the annotated and the propagated node labels, wherein the classifier is configured to predict the one or more nodes labels for the elements of the compressed feature vectors.

According to another embodiment a computer program product for determining a set of target items to be annotated for training a machine learning application by a system comprising a processor and computer readable memory is provided. The computer program product comprises a computer readable storage medium having program instructions embodied therewith, the program instructions executable by the system to cause the system to perform a method comprising providing a training data set comprising a set of data samples. The set of data samples comprises a plurality of data items such as pixels. The method further comprises providing an auto-encoder. The auto-encoder encompasses a classifier. The method comprises performing an initial training of an embedding model of the auto-encoder, wherein the embedding model is configured to map the set of data samples to a set of compressed feature vectors. The feature vectors comprise feature elements. The set of compressed feature vectors define a compressed feature matrix of the set of data samples. The method comprises providing a definition of a graph associated to the compressed feature matrix, applying a clustering-algorithm to identify one or more node clusters of the graph and applying a centrality algorithm to identify one or more central nodes of the one or more node clusters. The method comprises retrieving from an annotator one or more node labels for the one or more central nodes of the one or more node clusters. This creates annotated node labels. The method comprises propagating the annotated node labels of the one or more central nodes to other nodes of the graph, thereby creating propagated node labels and performing a further training of the auto-encoder. The further training of the autoencoder comprises training the embedding model of the auto-encoder and the classifier of the auto-encoder with the annotated and the propagated node labels. The classifier is configured to predict the one or more nodes labels for the elements of the compressed feature vectors.

According to another embodiment a computer-implemented method for training a machine learning application is provided. The method comprises providing a training data set comprising a set of data samples and a set of target items to be annotated to an annotator, receiving the training data set with the annotated target items and training a cognitive model of the machine learning application with the training data comprising the annotated target items. Further embodiments relate to a training data set obtainable by the method for training a machine learning application and a cognitive model obtainable by the method for training a machine learning application.

Embodiments of the invention will be described in more detail below, by way of illustrative and non-limiting examples, with reference to the accompanying drawings.

DETAILED DESCRIPTION

In reference to FIGS. 1-7, some general terms of embodiments of the invention are described.

The term ground truth may generally refer to information provided by direct observation (i.e. empirical evidence) as opposed to information provided by inference.

Embodiments of the invention provide a computer-implemented method to generate training data and ground-truth for machine learning algorithms and applications in an efficient way.

Graph theory is the study of graphs, which are mathematical structures used to model pairwise relations between objects. A graph in this context is made up of vertices or nodes and lines called edges that connect them. Graphs are widely used in applications to model many types of relations and process dynamics in physical, biological, social and information systems. Accordingly, many practical problems in modern technological, scientific and business applications are typically represented by graphs.

The centrality of a node is a widely used measure to determine the relative importance of a node within a full network or graph. Node centralities may be used to determine which nodes are important in a complex network, e.g. to understand influencers or to find hot spot links. For example, node centralities are typically used to determine how influential a person is within a social network, or, in the theory of space syntax, how important a room is within a building or how well-used a road is within an urban network.

Figure 1A:
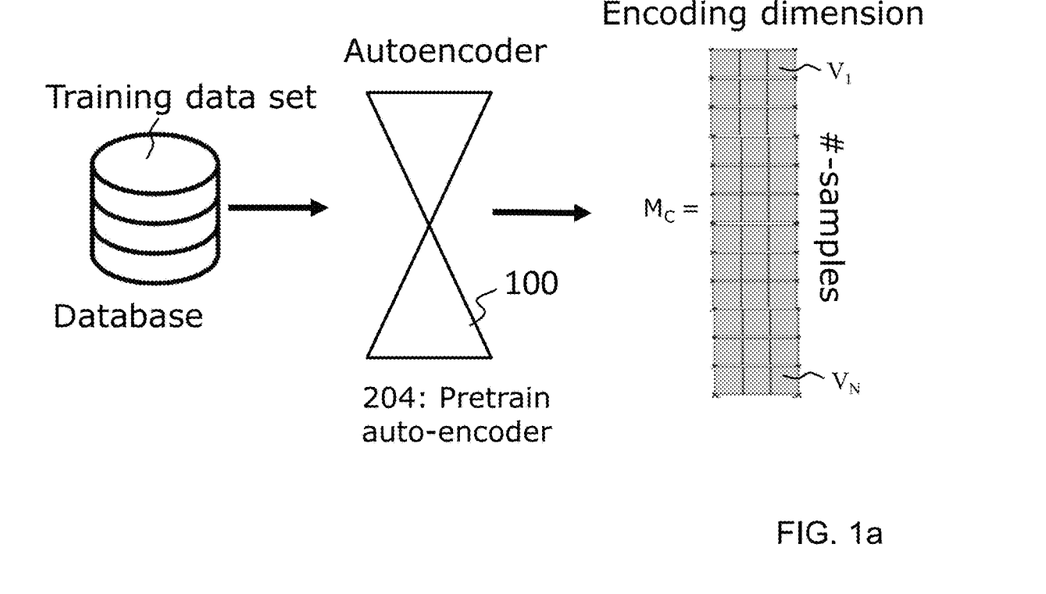
FIG. 1a, FIG. 1b and FIG. 1c illustrate a computer-implemented method according to an embodiment of the invention.
Figure 1B:
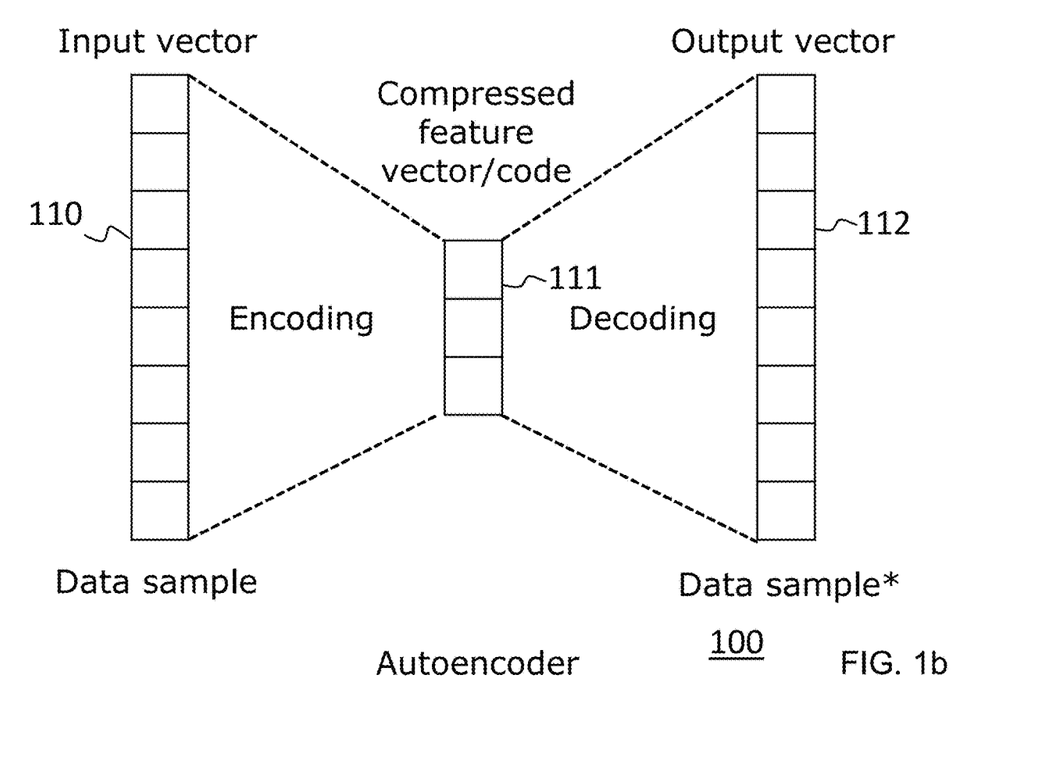
Figure 1C:
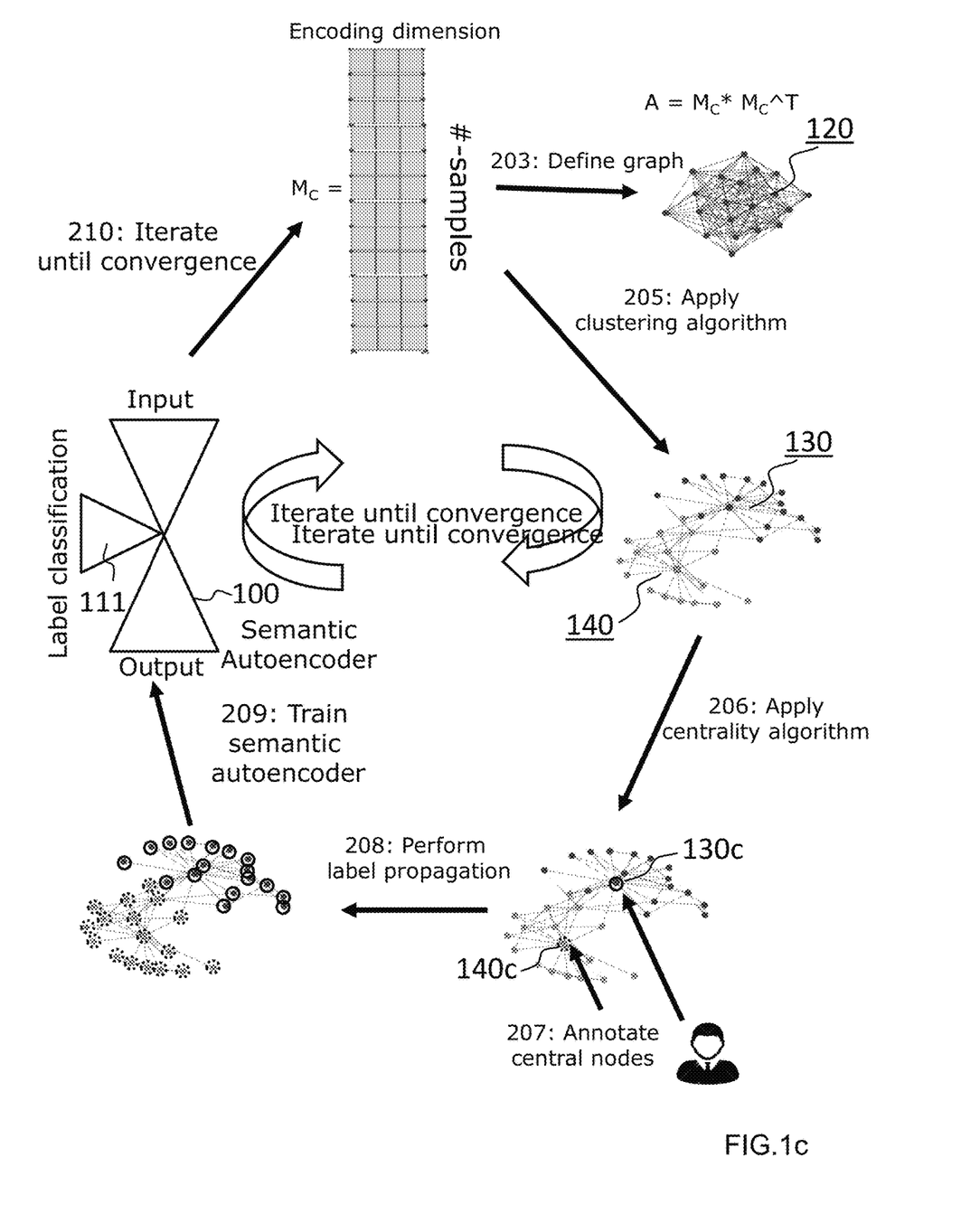

FIGS. 1a, 1b and 1c illustrate a computer-implemented method according to an embodiment of the invention.

Figure 2A:
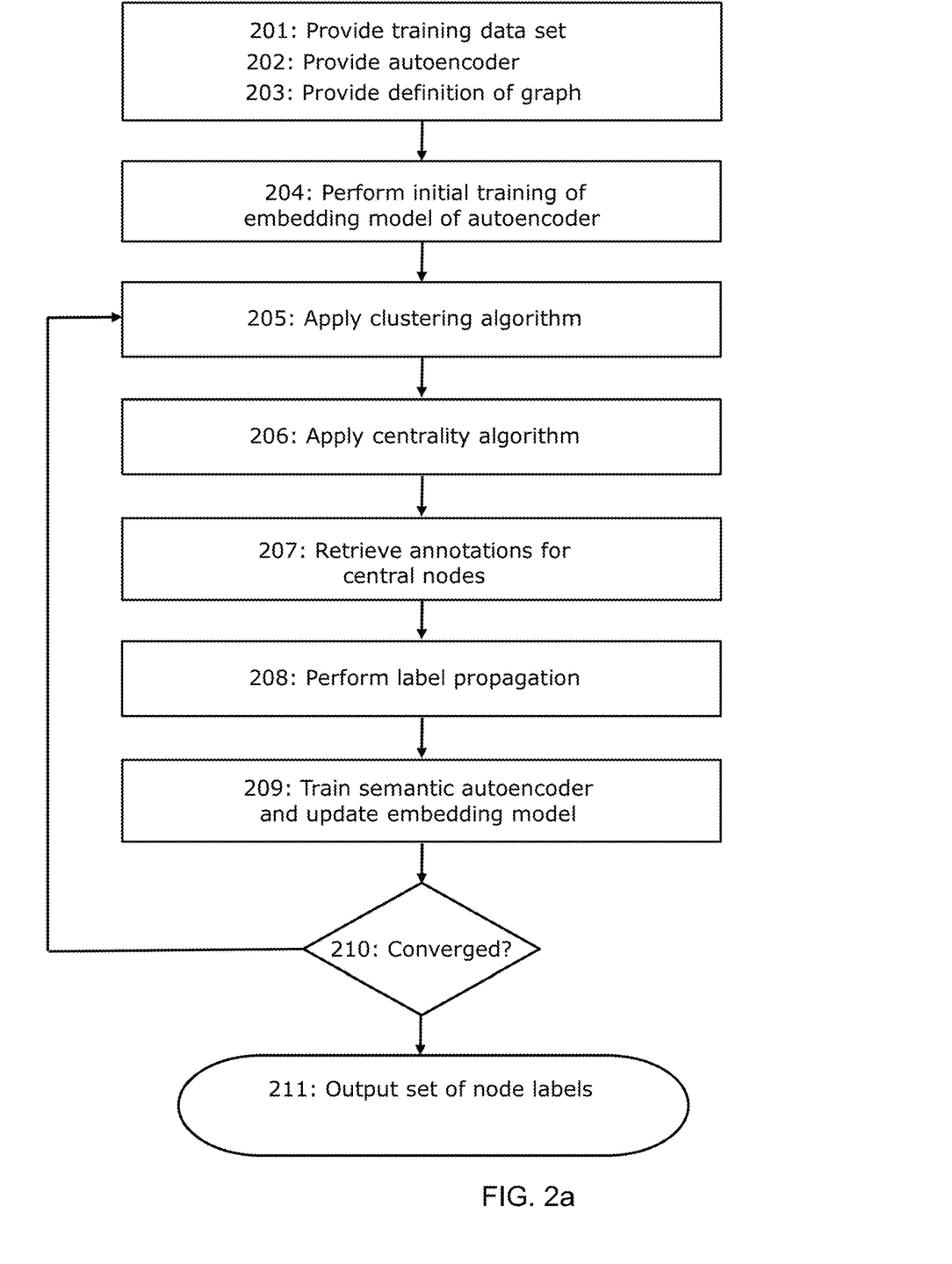
FIG. 2a shows a corresponding flow chart of the method illustrated in FIGS. 1a, 1b and 1c.
Figure 3:
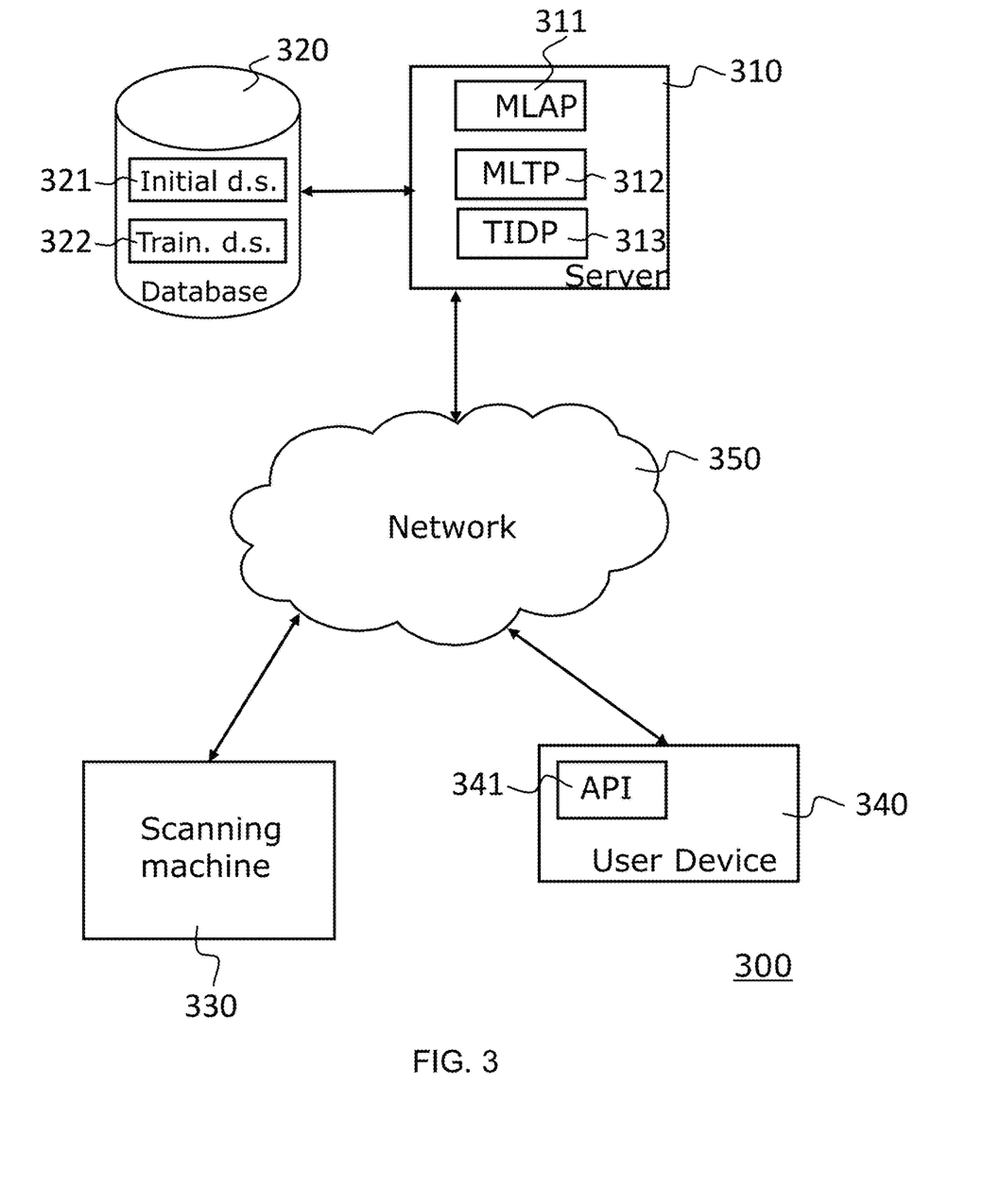
FIG. 3 shows a schematic block diagram of computing system which may be used to perform the computer-implemented methods as illustrated in FIGS. 1a, 1b, 1c and in FIGS. 2a, 2b and 2c.

FIG. 2a shows a corresponding flow chart of the method illustrated in FIGS. 1a, 1b and 1c. FIG. 3 shows a schematic block diagram of computing system which may be used to perform the computer-implemented method as illustrated in FIGS. 1a, 1b, 1c and 2a.

Referring at first to FIG. 3, it shows a computing system 300 comprising a server 310 which is configured to run a machine learning application program (MLAP) 311, a machine learning training program (MLTP) 312 for training the application program and a target item determination program (TIDP) 313 for determining target items of large datasets that should be annotated to generate a training data set for a machine learning application in an efficient manner. The machine learning application 311 may be in particular a deep learning application.

The server 310 is coupled with a database 320. The database 320 may comprise a storage 321 for storing one or more datasets, in particular large datasets. The datasets which are stored in the storage 321 may be in particular datasets that have not been annotated so far. Hence the datasets which are stored in the storage 321 may also be denoted as initial datasets, raw datasets or initial training data sets. Each of the datasets may comprise a plurality of data samples. The plurality of data samples may encompass e.g. images of various types (e.g. {cats, dogs}, {line-plots, scatter-plots, histograms, geological maps or text (sentences, paragraphs, full-texts). Each of the plurality of data samples may comprise a plurality of data items, e.g. a plurality of pixels.

The database 320 comprises furthermore a storage 322 for storing training data sets. The training data sets may be derived from the initial or raw datasets by annotation of one or more target items in the plurality of data samples of the initial or raw data sets.

The system 300 further comprises a scanning machine 330. The scanning machine 330 may provide scanning as well as printing functionality. Hence the scanning machine 330 may also be denoted as scanning/printing machine. The system 300 further comprises a user device 340. The user device 340 may comprise a display and user input means such as a keyboard to provide a user interface to a user of the system 300. The user device 340 may comprise in particular an application programming interface (API) 341 that is adapted to provide an interface to the programs 311, 312 and 313 running on the server 310.

The server 310, the scanning machine 330 and the user device 340 are coupled to a network 350 and may communicate with each other via the network 350. The network 350 may be embodied as a local area network (LAN), a general wide area network (WAN) and/or a public network (e.g., the Internet).

Referring now to FIGS. 1a and 2a, the method starts with a block 201. At the block 201, an initial training data set is provided. The initial training data set may generally be any data set that shall be annotated in order to provide an annotated training data set as ground truth for a machine learning application program. The initial training data set may be stored in the storage 321 of the database 320 and it may be received e.g. via the network 350.

Furthermore, at a block 202, an autoencoder 100 is provided and at a block 203 a definition of a graph for a compressed feature matrix which will be provided by the autoencoder 100.

The autoencoder 100 comprises an embedding model and a classifier. The autoencoder 100 may be embodied as a neural network that is configured learn an efficient encoding or in other words an efficient representation of data samples of the training data set. The autoencoder 100 may comprise several hidden layers.

At a block 204, the autoencoder 100 performs an initial training of its embedding model. The initial training is performed with an initial data set which comprises a plurality of data samples, e.g. the data set that is stored in the storage 321 of the database 320. The embedding model of the autoencoder 100 is configured to map the set of data samples to a set of compressed feature vectors comprising feature elements. The embedding model of the autoencoder 100 is at the block 204 an unsupervised embedding model.

More particularly, and referring now to FIG. 1b, the autoencoder 100 maps an input vector 110 of a data sample to a compressed feature vector 111. This mapping may also be denoted as encoding. The compressed feature vector establishes a code for the input vector 110.

The input vector 110 comprises a plurality of vector elements, e.g. a plurality of pixels of an image. Along with the encoding side, the autoencoder is configured to learn a decoding side in order to decode the encoding back into an output vector 112 corresponding to a data sample*. More particularly, the autoencoder 100 aims to decode the encoding/the compressed feature vector such that the output vector 112 and the corresponding data sample* is as close as possible to the input vector 110 and the input data sample. The size of the compressed feature vector 111, e.g. the number of elements of the compressed feature vector 111, defines the encoding dimension of the autoencoder 100.

The autoencoder 100 is configured to map each data sample and its corresponding input vector into a compressed feature vector. The set of compressed feature vectors define a compressed feature matrix $M_C$ of the set of data samples. The compressed feature matrix $M_C$ has the size "encoding dimension*number of data samples" or in in other words it is built by a concatenation of all the compressed feature vectors 111 of the set of data samples. As a simple example, if the data set comprises 5 data samples which are mapped to compressed feature vectors $V_1$, $V_2$, $V_3$, $V_4$ and $V_5$, the compressed feature matrix $M_C$ reads as follows:

$$M_C = (V_1 V_2 V_3 V_4 V_5)$$

Or more generally, the compressed feature matrix $M_C$ comprises N feature vectors $V_1, \ldots V_N$ if the data set comprises N data samples. The graph which is defined at block 203 may be defined according to embodiments by an adjacency matrix A. The adjacency matrix A may be defined by the product of the compressed feature matrix $M_C$ and the transpose $M_C^T$ of the compressed feature matrix, i.e.:

$$A = M_C * M_C^T$$

An exemplary graph is shown as graph 120 in FIG. 1c. After the initial training of the embedding model, the method applies, at a block 205, a clustering algorithm to identify one or more clusters of the graph.

A clustering algorithm according to embodiments of the invention aims at identifying one or more clusters in the graph defined by the adjacency matrix A. In general, a clustering algorithm performs the task of grouping a set of objects in such a way that objects in the same group (cluster) are more similar according to some predefined criteria to each other than to those in other groups (other clusters).

A plurality of clustering algorithms are known to a skilled person in the art which may be chosen according to embodiment in dependence on the respective data set. According to embodiments, clustering algorithms which are particularly suited to cluster graphs may be used. Such graph-based clustering algorithms may include k-spanning tree or minimum spanning tree algorithms, shared nearest neighbor algorithms, algorithms based on betweenness centrality or spectral clustering algorithms.

Referring to FIG. 1c, a first cluster 130, indicated with black nodes, and a second cluster 140, indicated with grey nodes, is shown.

Next, at a block 206, the computer-implemented applies a centrality algorithm to identify one or more central nodes of the one or more node clusters, e.g. of the clusters 130 and 140 of FIG. 1c. Referring to FIG. 1c, the central node 130c of the cluster 130 and the central node 140c of the cluster 140 have been identified.

In graph analytics, the centrality of a node is a widely used measure to determine the relative importance of a node within a full network or graph. Node centralities may be used to determine which nodes are important in a complex network, to understand influencers, or to find hot spot links For example, node centralities are typically used to determine how influential a person is within a social network, or, in the theory of space syntax, how important a room is within a building or how well-used a road is within an urban network.

A plurality of centrality algorithms is known to a skilled person in the art which may be chosen according to embodiment in dependence on the respective data set. According to embodiments centrality algorithms which are particularly suited for graphs may be used.

According to an embodiment, a graph-based clustering algorithm may be used which comprises approximating a product of a matrix exponential and a random probe vector of the adjacency matrix defining the graph. The graph-based clustering algorithm further comprises computing a diagonal of the adjacency matrix based on the product of the matrix exponential and the random probe vector and calculating node centralities based on the computed diagonal until a predefined number of the one or more central nodes has been detected. Such a method is described in detail in US 2014/0351307 A1, the whole content of it being incorporated by reference.

Alternative methods according to further embodiments for computing node centralities may sample the nodes of the graph in an attempt to reduce the number of the nodes and thus the computational complexity.

According to embodiments, a plurality of metrics may be used for defining centrality and a plurality of corresponding centrality algorithms may be used. Such metrics include e.g. degree centrality, betweenness centrality, closeness centrality and Eigenvector centrality of the graph.

Then, at a block 207, a human annotator is asked to annotate the central nodes 130c and 140c. For this annotation, the corresponding part of the original data sample, e.g. of the original image, is also shown to the human annotator. The human annotator assigns a label as annotation to the central nodes 130c and 140c. In general, one or more labels may be associated with any given node of the graph, where each such label indicates some characteristic of the item corresponding to that node. For example, the value of a particular label may indicate a type, classification, property, feature, etc., of an item in the system represented by the graph. The label may be e.g. the content of the corresponding part of the image. As an example, the annotator may label the central node 130c as "dog" and the central node 140c as "cat". The computer-implemented program receives these labels as annotation e.g. via the user device 340 as shown in FIG. 3. As a result, annotated node labels have been created. In the example of FIG. 1c the annotated node label for the node 130c which could represent e.g. the label "cat" is illustrated by a solid ring and the annotated node label for the node 140c which could represent e.g. the label "dog" is illustrated by a dotted ring.

At a block 208, the program performs a label propagation of the annotated node labels to the other nodes of the graph, more particularly the other nodes of the identified clusters 130 and 140. This has created propagated node labels as illustrated in FIG. 1c with the solid or dotted rings.

Label propagation has an important role in many applications of network science, including link prediction, recommendation systems, community detection, seed set expansion, semi-supervised learning, and many more. According to embodiments, a plurality of label propagation algorithms may be used. According to embodiments, the label propagation operation can be performed by applying a propagation function to the annotated node labels. The propagation function may generally be a function of a matrix X defining the graph, in particular of the adjacency matrix A of the graph, or a matrix derived from the adjacency matrix such as the corresponding Laplacian matrix or a function thereof.

Many different propagation functions are known. Particular examples of known propagation functions which may be used according to embodiments include variations on the exponential kernel ($e^{\alpha A}$) and the von Neumann kernel $(I-\alpha A)^{-1}$, where I is the identity matrix. Such known propagation functions are based on the assumption of homophily, which is the notion that elements in a graph are connected to others that share the same properties, and by extension that similar elements are linked by (multiple) short paths.

According to embodiments, the propagation function may be defined as a Chebyshev expansion $f(X)=\Sigma_{j=0}\ c_j\ P_j(x)$ where $P_j$ is the j-th Chebyshev polynomial.

Then, at a block 209, the computer-implemented method performs a further training of the auto-encoder 100. The further training uses the annotated and propagated node labels. More particularly, the autoencoder 100 also comprises a classifier 102 which is configured to predict node labels for the elements of the compressed feature vectors. The elements of the compressed feature vector correspond to the nodes of the graph 120. The further training comprises a training of the embedding model of the auto-encoder 100 as well as of the classifier 102 of the auto-encoder 100 with the annotated and the propagated node labels. This will be explained in more detail further below.

Then, at one or more iteration blocks 210, the computer-implemented iterates the above mentioned blocks, more particularly the block 205 of the applying of the clustering algorithm, the block 206 of the applying of the centrality algorithm, the block 207 of retrieving annotations for the central nodes, the block 208 of propagating the annotated labels and the block 209 of performing the further training of the auto-encoder 100 until convergence. In this respect convergence shall mean that the clusters 130 and 140 have been separated apart from each other in a sufficient manner according to a predefined convergence criteria. More particularly, before each of the iterations it is checked at the block 210 whether the predefined convergence criteria has been fulfilled.

It should be noted that according to embodiments the iteration rounds may not comprise the block 207 of retrieving annotations for the central nodes. This may be performed or repeated optionally as needed during the iteration rounds. In particular, if the central nodes of the clusters that have been identified in the first or a subsequent step of the application of the clustering and the centrality algorithm have not changed, there may be no need for a further human annotation of these central nodes/clusters.

If the predefined convergence criteria has been fulfilled, the computer-implemented method outputs at a block 211 the set of node labels that have been annotated in the previous iteration rounds. In the example as illustrated in FIG. 1c, these would be only the two node labels of a dotted ring and a solid ring corresponding to the labels "cats" and "dogs".

The output of the node labels establish a set of target items that should be annotated in the training data set in order to train a machine learning algorithm successfully. The training data set may then be submitted to one or more human annotators to perform the (limited) annotation task to only label the determined set of target items in the training data set. In the above presented example this would mean that the human annotator needs to only label "cats" and "dogs" in the data samples of the training data set.

Figure 2B:
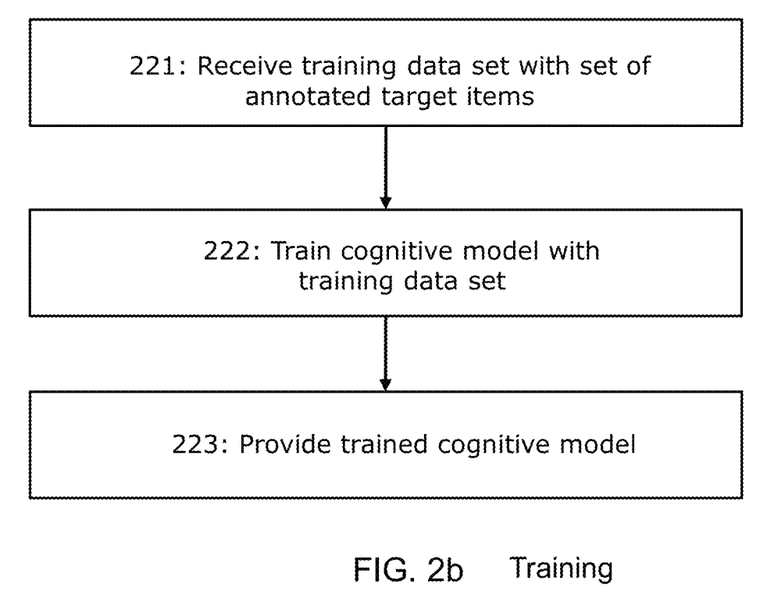
FIG. 2b shows a computer-implemented method for training a machine learning application with a training data set.

The generated training data set comprising the annotated target items establishes then ground truth for training a machine learning application as illustrated in FIG. 2b.

At a block 221, a training data set is received, e.g. by the machine learning training program 312. The training data set comprises the annotations of the set of target items as explained above. At a block 222, the machine learning training program 312 trains a cognitive model of the machine learning application program 311 with the training data set.

At a block 223, the machine learning training program 312 provides the trained cognitive model as output.

Figure 2C:
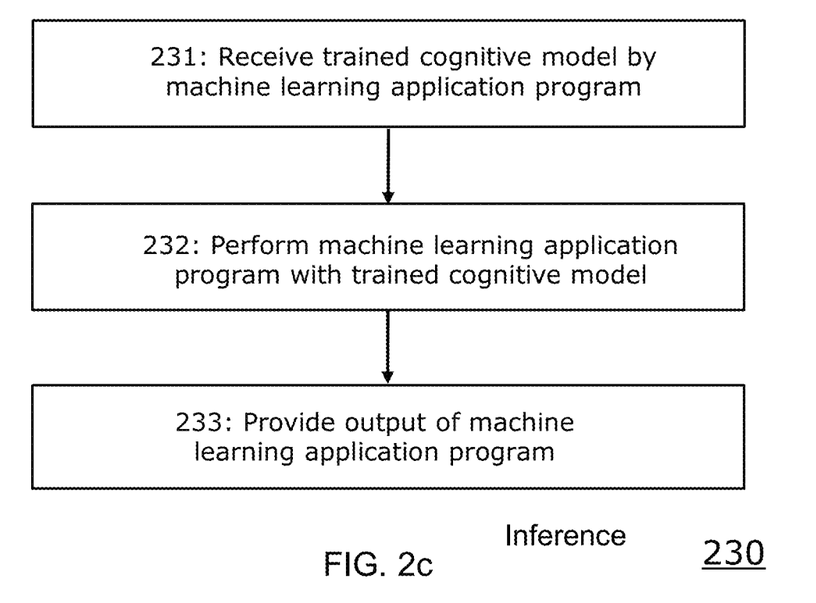
FIG. 2c shows a computer-implemented method for performing a machine learning application.

Referring now to FIG. 2c, a computer-implemented method 230 for performing a machine learning application is provided. The method may be performed e.g. by the machine learning application program 311 as shown in FIG. 3.

At a block 231, the machine learning application program 311 receives a trained cognitive model, e.g. from the machine learning training program 312.

At a block 232, the machine learning application program 311 uses the cognitive model to perform the machine learning application.

At a block 233, the machine learning application program 311 provides an output of the machine learning application program.

The computer-implemented method 230 as shown in FIG. 2c establishes an inference phase of the machine learning application and its underlying algorithm.

Figure 4:
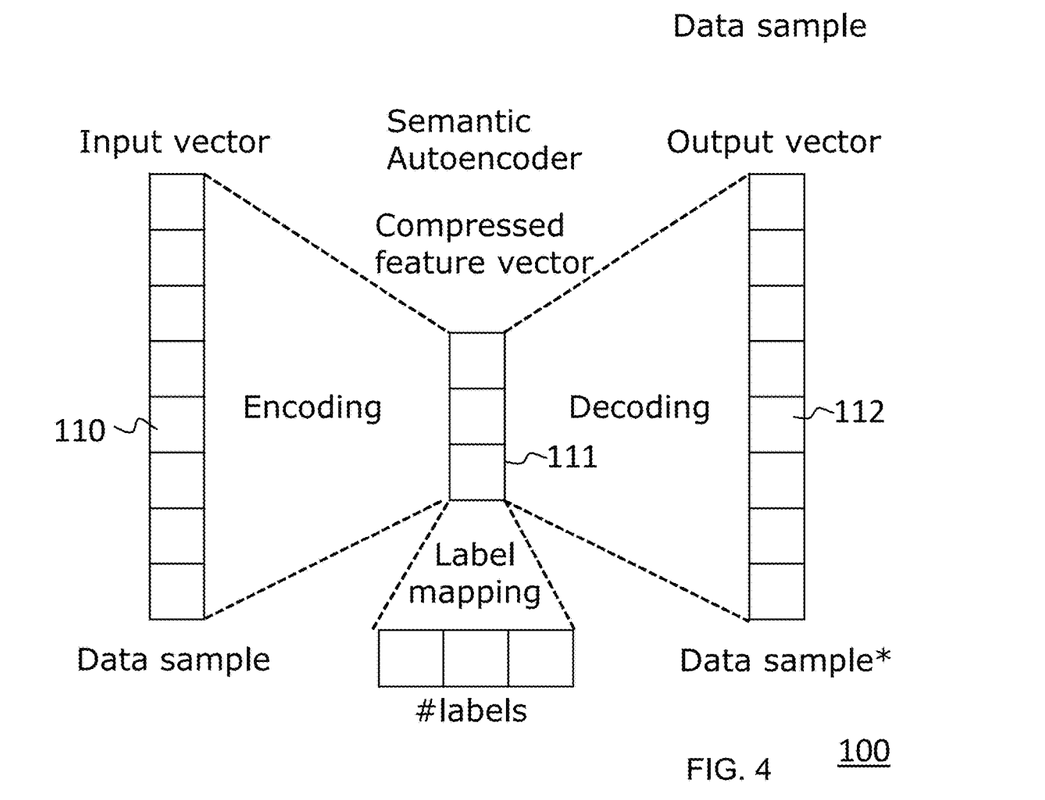
FIG. 4 shows a mapping performed by an autoencoder during training.
Figure 5:
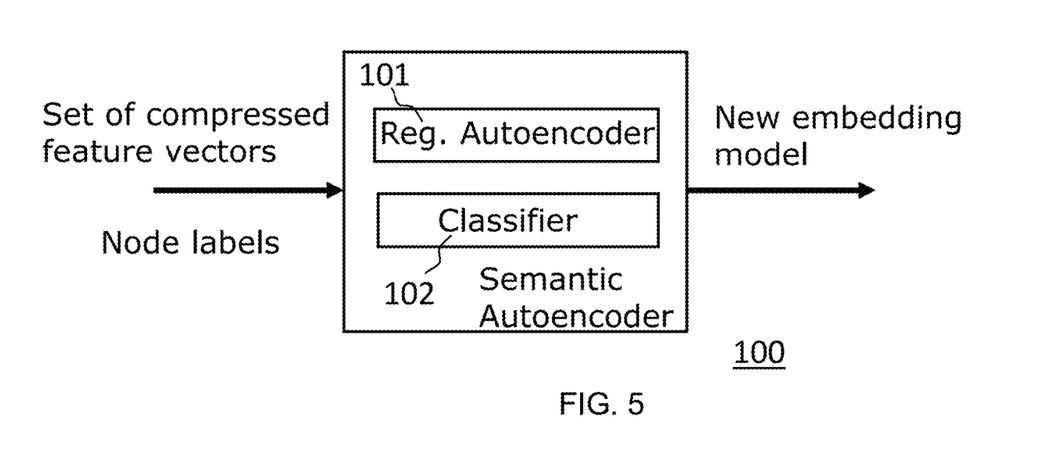
FIG. 5 shows an exemplary block diagram of an autoencoder according to an embodiment of the invention.

FIGS. 4 and 5 illustrate the functioning and structure of the autoencoder 100 according to embodiments of the invention in more detail. In this respect, FIG. 4 shows the mapping performed by the autoencoder 100 during the training step 209 in more detail and FIG. 5 shows an exemplary block diagram of the autoencoder 100.

Referring to FIG. 4, the autoencoder 100 performs on the one hand a mapping of the input vectors 110 of the data samples to corresponding compressed feature vectors 111. And, as before, the autoencoder is configured to learn a decoding side in order to decode the encoding back into corresponding output vectors 112. In addition, the autoencoder 100 is also configured to take into consideration the labels that have been assigned per annotation or propagation during the current iteration round. More particularly, the autoencoder 100 performs at block 209 also a label mapping of the compressed feature vectors to the labels that have been assigned (per annotation and/or propagation) in the current iteration round. In other words, the autoencoder 100 predicts node labels for the respective elements of the compressed feature vectors 111. The prediction of the node labels is performed with the classifier 102. As the autoencoder 100 considers, at the block 209, also the class labels, it may be denoted as semantic autoencoder. According to embodiments one may consider the sematic autoencoder as an autoencoder that is "supervised" by the labels which are predicted from the graph.

Hence, and referring now to FIG. 5, the autoencoder 100 may be described according to embodiments as a regular autoencoder 101 which encodes input vectors into compressed feature vectors and decodes it back into an output vector. And in addition, the autoencoder 100 comprises the classifier 102 and which in addition predicts labels for the compressed feature vectors by its embedding model. As a result of the training block 209, an updated embedding model has been computed which will be used for the next iteration round.

Figure 6:
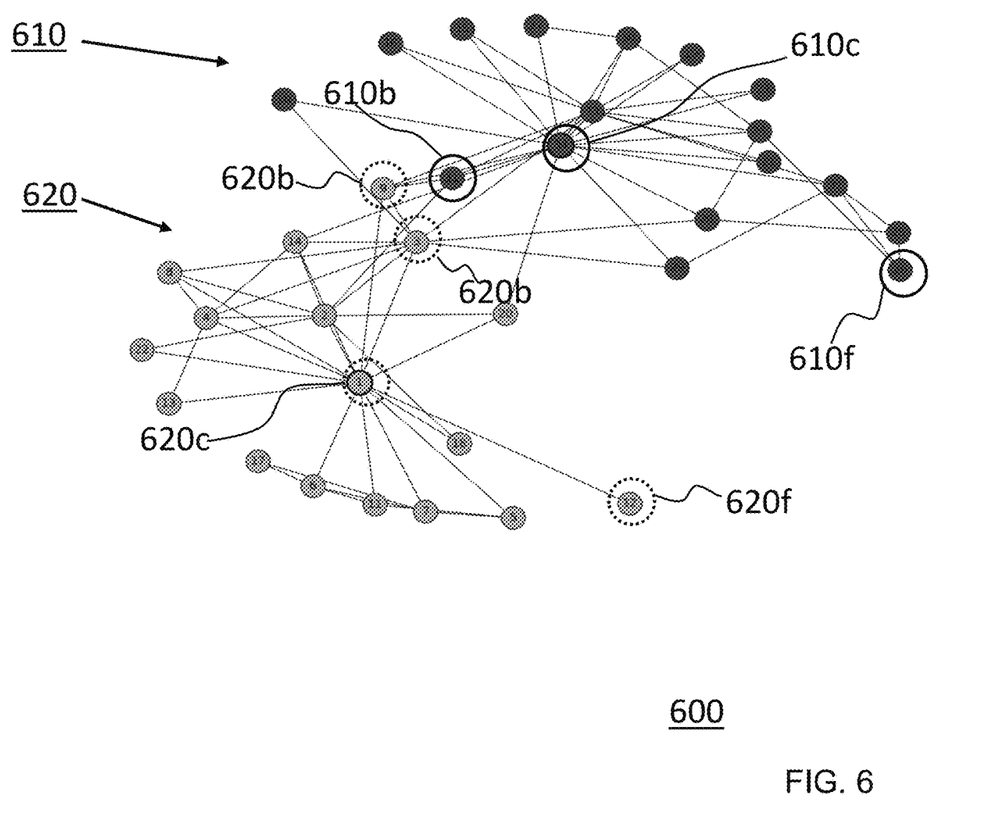
FIG. 6 shows a graph on which a computer-implemented method according to embodiments of the invention shall be applied.

FIG. 6 shows a graph 600 on which a computer-implemented method according to embodiments of the invention shall be applied. The graph 600 may be also be defined by an adjacency matrix defined by the product of the compressed feature matrix $M_C$ and the transpose $M_C^T$ of the compressed feature matrix as explained above with reference to FIG. 1c. Methods according to embodiments of the invention apply at first a clustering algorithm as described with reference to block 205 to identify one or more clusters of the graph. In this example a first cluster 610, indicated with black nodes, and a second cluster 620, indicated with grey nodes, is shown. Then, as described with reference to block 206, the computer-implemented applies a centrality algorithm to identify one or more central nodes of the one or more node clusters, i.e. of the clusters 610 and 620. In FIG. 6, the central nodes 610c of the cluster 610 and the central node 620c of the cluster 620 has been identified.

Now, the method according to this embodiment comprises identifying one or more border nodes. The border nodes may be defined as nodes which are situated at a border between two of the clusters, i.e. at the border between the clusters 610 and 620. The border nodes may be computed or determined by predefined criteria by means of various methods and algorithms known to a skilled person in the art.

In FIG. 6 it is assumed in an exemplary way that the algorithm has computed the node 610b of the cluster 610 as border node and the two nodes 620b of the cluster 620 as border nodes.

According to embodiments the method may further comprise retrieving from one or more annotators node labels for the one or more border nodes. In the example of FIG. 6 the annotated node label for the border node 610b which could represent e.g. the label "cat" is illustrated by a solid ring and the annotated node label for the border nodes 620b which could represent e.g. the label "dog" is illustrated by a dotted ring. These correspond in this example to the labels of the corresponding central nodes 610c and 620c of the clusters 610 and 620 respectively.

According to further embodiments, the method may comprise identifying one or more farthest nodes from the one or more clusters. The farthest nodes may be defined as nodes of a respective cluster which are farthest away from the central node of the respective cluster. The farthest nodes may be computed or determined by predefined criteria by means of various methods and algorithms known to a skilled person in the art.

In FIG. 6 it is assumed in an exemplary way that the algorithm has computed the node 610f of the cluster 610 as farthest node and the node 620f as farthest node of the cluster 620.

According to embodiments, the method may further comprise retrieving from one or more annotators node labels for the one or more farthest nodes. In the example of FIG. 6 the annotated node label for the farthest node 610f which could represent e.g. the label "cat" is illustrated by a solid ring and the annotated node label for the farthest node 620f which could represent e.g. the label "dog" is illustrated by a dotted ring. These correspond in this example with the labels of the corresponding central nodes 610c and 620c of the clusters 610 and 620 respectively.

Figure 7:
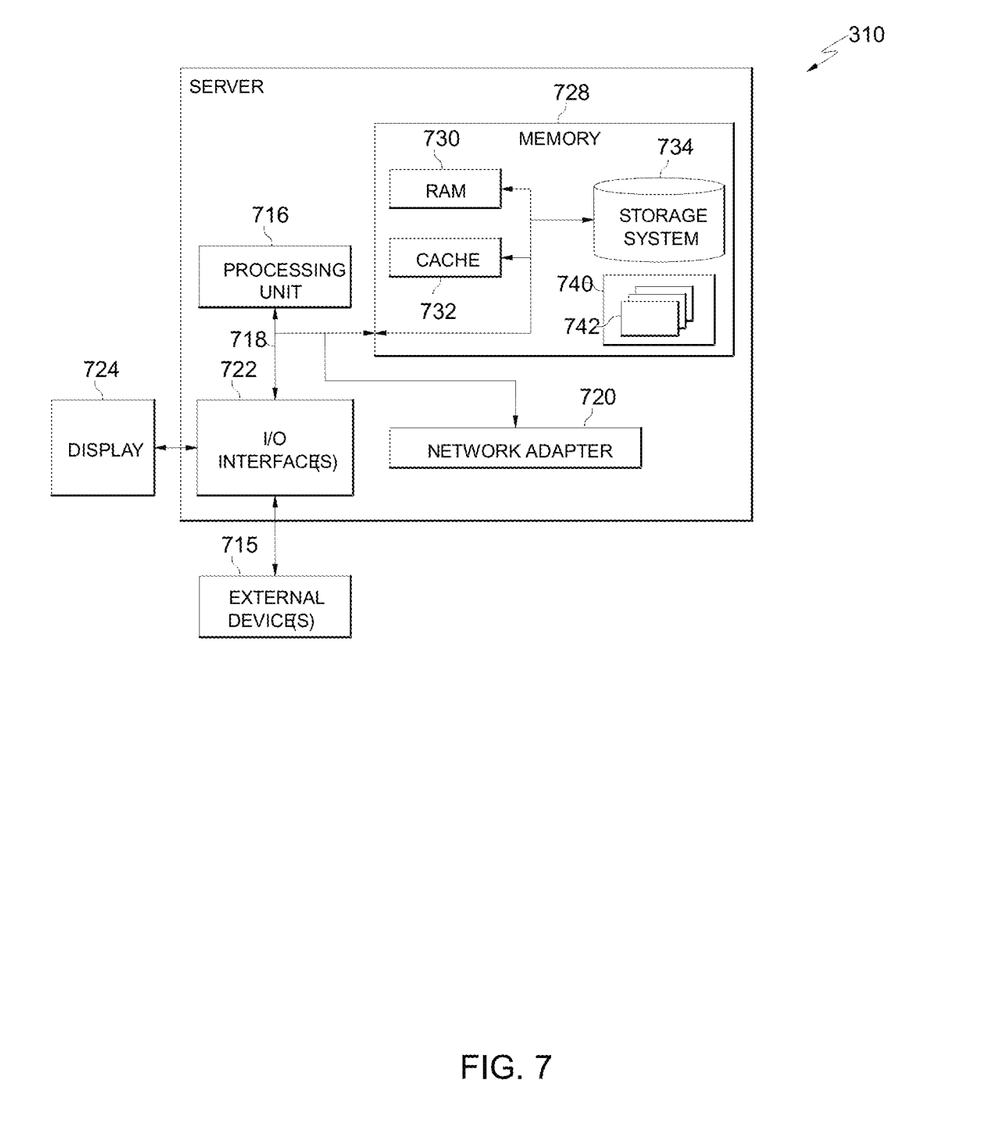
FIG. 7 shows a more detailed block diagram of a server according to an embodiment of the invention.

Referring now to FIG. 7, a more detailed embodiment of the server 310 is illustrated. The server 310 may be operational with numerous other computing system environments or configurations. Examples of well-known computing systems, environments, and/or configurations that may be suitable for use with server 310 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. In particular the server 310 is operational with the scanning machine 330 of the system 300 and a user device 340 of the system 300 as shown in FIG. 3.

The server 310 may be described in the general context of computer system-executable instructions, such as program modules, being executed by a computer system. Generally, program modules may include routines, programs, objects, components, logic, data structures, and so on that perform particular tasks or implement particular abstract data types. The server 310 is shown in the form of a general-purpose computing device. The components of server 310 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Server 310 typically includes a variety of computer system readable media. Such media may be any available media that is accessible by server 310, and it includes both volatile and non-volatile media, removable and non-removable media.

System memory 728 can include computer system readable media in the form of volatile memory, such as random access memory (RAM) 730 and/or cache memory 732. Server 310 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein. Program modules 742 may carry out in particular one or more steps of a computer-implemented method for determining a set of target items to be annotated for training a machine learning application according to embodiments of the invention, e.g. one or more steps of the method as described with reference to FIGS. 2a, 2b and/or 2c. Program modules 742 may encompass in particular the programs 311, 312 and 313 as described with reference to FIG. 3 and the corresponding flow charts in FIGS. 2a, 2b and 2c.

Server 310 may also communicate with one or more external devices 715 such as a keyboard, a pointing device, a display 724, etc.; one or more devices that enable a user to interact with server 310; and/or any devices (e.g., network card, modem, etc.) that enable server 310 to communicate with one or more other computing devices. Such communication can occur via Input/Output (I/O) interfaces 722. Still yet, server 310 can communicate with one or more networks such as a local area network (LAN), a general wide area network (WAN), and/or a public network (e.g., the Internet) via network adapter 720. As depicted, network adapter 720 communicates with the other components of server 310 via bus 718. It should be understood that although not shown, other hardware and/or software components could be used in conjunction with server 310. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor/processing unit of the server 310 and/or the user device 340 to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer-implemented method comprising:
   providing a training data set comprising a set of data samples;
   providing an auto-encoder, the auto-encoder encompassing a classifier;

performing an initial training of an embedding model of the auto-encoder, the embedding model being configured to map the set of data samples to a set of compressed feature vectors comprising feature elements, the set of compressed feature vectors defining a compressed feature matrix of the set of data samples;

providing a definition of a graph associated to the compressed feature matrix;

applying a clustering-algorithm to identify one or more node clusters of the graph;

applying a centrality algorithm to identify one or more central nodes of the one or more node clusters;

retrieving from an annotator one or more node labels for the one or more central nodes of the one or more node clusters, thereby creating annotated node labels;

propagating the annotated node labels of the one or more central nodes to other nodes of the graph, thereby creating propagated node labels; and performing a further training of the auto-encoder, the further training comprising training the embedding model of the auto-encoder and the classifier of the auto-encoder with the annotated and the propagated node labels, wherein the classifier is configured to predict the one or more node labels for the elements of the compressed feature vectors.

2. The method according to claim 1, the method further comprising:

repeating, at one or more iteration rounds, the applying of the clustering algorithm, the applying of the centrality algorithm, the propagating of the annotated labels and the performing of the further training of the auto-encoder until convergence.

3. The method according to claim 2, further comprising outputting the one or more node labels of the last iteration round before convergence as set of target items to be annotated.

4. The method according to claim 1, the method further comprising:

repeating retrieving from one or more annotators node labels for the one or more central nodes of the one or more node clusters.

5. The method according to claim 1, wherein the graph is defined by an adjacency matrix, the adjacency matrix being the product of the compressed feature matrix and a transpose of the compressed feature matrix.

6. The method according to claim 1, wherein applying the clustering algorithm comprises applying a graph-based clustering algorithm.

7. The method according to claim 1, wherein applying the centrality algorithm comprises applying a graph-based centrality algorithm.

8. The method according to claim 6, wherein the graph-based clustering algorithm is selected from the group consisting of:

k-spanning tree or minimum spanning tree algorithms;
shared nearest neighbor algorithms;
algorithms based on betweenness centrality; and
spectral clustering algorithms.

9. The method according to claim 7, wherein the graph-based centrality algorithm comprises:

approximating a product of a matrix exponential and a random probe vector of the adjacency matrix;

computing a diagonal of the adjacency matrix based on the product of the matrix exponential and the random probe vector; and calculating node centralities based on the computed diagonal until a predefined number of the one or more central nodes has been detected.

10. The method according to claim 1, the method further comprising:

identifying one or more border nodes, the border nodes being defined as nodes which are situated at a border between two of the clusters.

11. The method according to claim 10, the method further comprising:

retrieving from one or more annotators node labels for the one or more border nodes.

12. The method according to claim 1, the method further comprising:

identifying one or more farthest nodes of the one or more clusters.

13. The method according to claim 12, the method further comprising:

retrieving from one or more annotators node labels for one or more farthest nodes of the one or more clusters.

14. The method according to claim 5, wherein the step of propagating the annotated node labels comprises applying a propagation function to the annotated node labels, wherein the propagation function is a function of the adjacency matrix.

15. The method as claimed in claim 14, wherein the propagation function is defined as a Chebyshev expansion $f(X)=\Sigma_{j=0}\ c_j\ P_j(x)$ where $P_j$ is the j-th Chebyshev polynomial.

16. The method according to claim 1, further comprising:

training a cognitive model of a machine learning application using the training dataset.

17. A system comprising one or more processors for executing computer-readable instructions, the computer-readable instructions controlling the one or more processors to perform operations comprising:

providing a training data set comprising a set of data samples;

providing an auto-encoder, the auto-encoder encompassing a classifier;

performing an initial training of an embedding model of the auto-encoder, the embedding model being configured to map the set of data samples to a set of compressed feature vectors comprising feature elements, the set of compressed feature vectors defining a compressed feature matrix of the set of data samples;

providing a definition of a graph associated to the compressed feature matrix;

applying a clustering-algorithm to identify one or more node clusters of the graph;

applying a centrality algorithm to identify one or more central nodes of the one or more node clusters;

retrieving from an annotator one or more node labels for the one or more central nodes of the one or more node clusters, thereby creating annotated node labels;

propagating the annotated node labels of the one or more central nodes to other nodes of the graph, thereby creating propagated node labels; and performing a further training of the auto-encoder, the further training comprising:

training the embedding model of the auto-encoder and the classifier of the auto-encoder with the annotated and the propagated node labels, wherein the classifier is configured to predict the one or more nodes labels for the elements of the compressed feature vectors.

18. The system according to claim 17 the system further comprising:
repeating, at one or more iteration rounds, the applying of the clustering algorithm, the applying of the centrality algorithm, the propagating of the annotated labels and the performing of the further training of the auto-encoder until convergence.

19. The system according to claim 17, the system further comprising:
outputting the one or more node labels of the last iteration round before convergence as set of target items to be annotated.

20. The system according to claim 18, the system being further configured to
repeat the step of retrieving from one or more annotators node labels for the one or more central nodes of the one or more clusters.

21. A computer program product comprising a computer-readable storage medium having program instructions embodied therewith, the program instructions executable by a processor to cause the processor to perform operations comprising:
providing a training data set comprising a set of data samples;
providing an auto-encoder, the auto-encoder encompassing a classifier;
performing an initial training of an embedding model of the auto-encoder, the embedding model being configured to map the set of data samples to a set of compressed feature vectors comprising feature elements, the set of compressed feature vectors defining a compressed feature matrix of the set of data samples;
providing a definition of a graph associated to the compressed feature matrix;
applying a clustering-algorithm to identify one or more node clusters of the graph;
applying a centrality algorithm to identify one or more central nodes of the one or more node clusters;
retrieving from an annotator one or more node labels for the one or more central nodes of the one or more node clusters, thereby creating annotated node labels;
propagating the annotated node labels of the one or more central nodes to other nodes of the graph, thereby creating propagated node labels; and
performing a further training of the auto-encoder, the further training comprising:
training the embedding model of the auto-encoder and the classifier of the auto-encoder with the annotated and the propagated node labels, wherein the classifier is configured to predict the one or more nodes labels for the elements of the compressed feature vectors.

22. The computer program product of claim 21, further comprising:
repeating, at one or more iteration rounds, the applying of the clustering algorithm, the applying of the centrality algorithm, the propagating of the annotated labels and the performing of the further training of the auto-encoder until convergence.

* * * * *